US008463323B2

(12) United States Patent
Li et al.

(10) Patent No.: US 8,463,323 B2
(45) Date of Patent: Jun. 11, 2013

(54) ANTENNA DEVICE, WIRELESS CELLULAR NETWORK AND METHOD OF CAPACITY EXPANSION

(75) Inventors: Yarui Li, Shenzhen (CN); Ming Ai, Shenzhen (CN); Tianzhong Zhao, Shenzhen (CN); Jindi Jiang, Shenzhen (CN); Guanxiang Ying, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 1510 days.

(21) Appl. No.: 12/010,015

(22) Filed: Jan. 18, 2008

(65) Prior Publication Data

US 2008/0119149 A1 May 22, 2008

Related U.S. Application Data

(63) Continuation of application No. PCT/CN2007/001312, filed on Apr. 20, 2007.

(30) Foreign Application Priority Data

Apr. 21, 2006 (CN) .......................... 2006 1 0074488
Jun. 15, 2006 (CN) .......................... 2006 1 0087159

(51) Int. Cl.
*H04M 1/00* (2006.01)

(52) U.S. Cl.
USPC ...................... 455/562.1; 455/187.1; 455/561

(58) Field of Classification Search
USPC ................................... 455/187.1, 561, 562.1
See application file for complete search history.

(56) References Cited

U.S. PATENT DOCUMENTS 4,231,040 A  10/1980  Walker
5,513,176 A *  4/1996  Dean et al. .................... 370/335
(Continued)

FOREIGN PATENT DOCUMENTS

CN  1679206 A  10/2005
CN  1732638     2/2006
(Continued)

OTHER PUBLICATIONS

Angelucci et al.; "High Performance Microstrip Networks for Multibeam and Reconfigurable Operation in Mobile-Radio Systems"; Proceedings of the Global Telecommunications Conference, vol. 3 of 3, pp. 1717-1721, (1994).

(Continued)

*Primary Examiner* — Justin Lee
(74) *Attorney, Agent, or Firm* — Finnegan, Henderson, Farabow, Garrett & Dunner, L.L.P.

(57) ABSTRACT

An antenna device, a wireless cellular network, and a method of capacity expansion are provided. The antenna device includes: a contact element adapted to connect a base station to receive input signals from the base station; an amplitude and phase allocating element adapted to allocate the input signals received by the contact element according to designed amplitudes and phases; an antenna element comprising an array of antennas comprising an even number of columns, and adapted to receive and transmit the input signals allocated with the amplitudes and phases. An array of antennas comprising an even number of columns has been adopted, and a feed network construction of the antenna system has been improved, so that through adjusting amplitudes and phases of original signals from a base station, a smooth capacity expansion of the network can be achieved without adjusting antenna directivities, thus reducing the workload and complexity for capacity expansion.

12 Claims, 5 Drawing Sheets

U.S. PATENT DOCUMENTS

| 6,198,434 | B1 | | 3/2001 | Martek et al. | |
|---|---|---|---|---|---|
| 2002/0058535 | A1 | * | 5/2002 | Lee | 455/562 |
| 2004/0023657 | A1 | | 2/2004 | Lim | |
| 2004/0127174 | A1 | | 7/2004 | Frank et al. | |
| 2004/0198292 | A1 | * | 10/2004 | Smith et al. | 455/272 |
| 2006/0111149 | A1 | * | 5/2006 | Chitrapu et al. | 455/562.1 |

FOREIGN PATENT DOCUMENTS

| EP | 0 076 213 | | 4/1983 |
|---|---|---|---|
| JP | 7-50606 | | 2/1995 |
| JP | 2001-320220 | | 11/2001 |
| WO | WO-02/19470 | A1 | 3/2002 |
| WO | WO-2005/015690 | A1 | 2/2005 |

OTHER PUBLICATIONS

Siachalon et al.; "On the Design of Switched-Beam Wideband Base Stations"; IEEE Antennas and Propagation Magazine, No. 46, No. 1, pp. 158-167, (2004).

Extended European search report including supplementary European search report and European search opinion from the European Patent Office for European Application No. EP 07 72 0885, (Jul. 7, 2008).

Communication pursuant to Article 94(3) EPC mailed Apr. 15, 2010, for European Patent Application No. 07 720 885.8.

Translation of First Chinese Office Action mailed Mar. 27, 2009, for Chinese Application No. 200610087159.7.

Translation of Second Chinese Office Action mailed Sep. 25, 2009, for Chinese Application No. 200610087159.7.

Translation of Third Chinese Office Action mailed Jan. 3, 2010, for Chinese Application No. 200610087159.7.

Translation of Fourth Chinese Office Action mailed Jun. 23, 2010, for Chinese Application No. 200610087159.7.

Communication from European Patent Office dated May 15, 2009, for European Patent application No. 07720885.8 (5 sheets).

Hansen, "Microwave Scanning Antennas," Array Systems, vol. III, Academic Press, New York and London, 1966, pp. 259-269 (7 sheets).

Butler et al., "Beam-Forming Matrix Simplifies Design of Electronically Scanned Antennas," Electronic Design, Apr. 12, 1961 (12 sheets).

Communication from European Patent Office dated Nov. 30, 2009, for European Patent Application No. 07720885.8 (4 pages).

Gao et al., "Integrated Multibeam Dual-Polarised Planar Array," IEE Proc.-Microw. Antennas Propag., vol. 148, No. 3, Jun. 2001, pp. 174-178 (5 pages).

Communication from Chinese Patent Office dated Jul. 11, 2008, for Chinese Patent Application No. 2006100744888 (4 pages).

English translation of the Written Opinion of the International Searching Authority dated Aug. 16, 2007, for PCT Application No. PCT/CN2007/001312 (3 pages).

First Chinese Office Action mailed Nov. 11, 2010, from Chinese Patent Office in counterpart Chinese Application No. 200780000278.7 (4 pages).

International Search Report from the Chinese Patent Office for International Application No. PCT/CN2007/001312, mailed Aug. 16, 2007, 2 pages.

\* cited by examiner

ANTENNA DEVICE, WIRELESS CELLULAR NETWORK AND METHOD OF CAPACITY EXPANSION

This application is a continuation of International Application No. PCT/CN2007/001312, filed Apr. 20, 2007. The International Application No. PCT/CN2007/001312 claims the benefit of priority to Chinese Patent Applications No. 200610074488.8, filed on Apr. 21, 2006, titled "WIRELESS CELLULAR NETWORK AND WIRELESS CELLULAR NETWORK EXPANSION REALIZING METHOD", and No. 200610087159.7, filed on Jun. 15, 2006, titled "ANTENNA DEVICE FOR BASE STATION AND METHOD FOR ANTENNA DEVICE OF BASE STATION", the contents of which are incorporated herein by reference in its entirety.

FIELD OF THE INVENTION

The present invention relates to mobile communication technologies and in particular to an antenna device, a wireless cellular network and a method for expanding capacity of a wireless cellular network.

BACKGROUND OF THE INVENTION

In a mobile communication system, a service area is covered by a plurality of Base Stations (BTS). An existing antenna of a base station has a single column of antennas, where there is only a longitudinal feed network but no horizontal feed network with a directivity diagram of approximately a regular hexagon. The coverage area of a base station adopting such antennas is like a cell of a beehive, and thus an existing mobile communication system is called as a "Cellular System". A mobile communication system may have numerous cells, and investment for that is very high, usually as high as tens or even hundreds of billions. Apparently, if each base station covers a larger area, i.e. the area of a cell is larger, the total number of base stations will be reduced, and thus the investment cost will be lowered. However, the capacity of each base station is limited, so its capacity density will be decreased with an enlarged coverage area. New base stations may need to be established with the number of users increasing, which is called network capacity expansion. With new base stations established, the area covered by an old cell should be diminished so as to make space for the newly-established base stations. This is called network splitting.

An ideal networking approach is to have larger coverage areas for individual base stations when initially establishing a network so as to reduce initial investment (because the number of registered users increases regularly from zero), and thus diminish capital to be invested and risk of investment, and to expand the capacity step by step with the number of users increasing, i.e. to split the network step by step. However, capacity expansion by means of network splitting requires additional necessary equipment, results in extra costs, and requires complex reconfiguration of local networks. Consequently, the network capacity expansion is neither "smooth" nor cost effective. Accordingly, the low initial investment conflicts with the high capacity expansion cost.

An existing wireless cellular system is networked basically in a three-sector form. This approach is advantageous in that 1) optimal match is obtained between the directivity diagram of antennas and a coverage area; and 2) cells are relatively normative, and directivities of antennas between base stations are staggered, thus minimizing interference between cells of the network. FIG. 1 is a schematic diagram of three-sector coverage, in which the circle indicates a location of a base station, and the arrows indicate directivities of an antenna of the base station. In such a structure, directivities of antennas are staggered. This is a favorable networking approach, and thus has been widely applied.

In a mobile communication system, as the number of users increases to some extent, new base stations are required for capacity expansion. However, for a wireless communication system, especially a 3G wireless communication system in compliance with WCDMA and CDMA2000 standards, capacity expansion by means of establishing new base stations requires addition of necessary equipment, and also causes extra cost. For instance, a new base station needs an additional site which gives rise to site costs. Moreover, because the coverage in a 3G system relates to capacity, both network planning and engineering are complex. Therefore, adding a new base station requires network planning that should consider both the new base station to be established and existing base stations around it, which results in new problems. Accordingly, for an addition of a new base station, there may be a "jump" with respect to costs, technologies and engineering, and consequently, such capacity expansion is not smooth.

For instance, to divide a coverage area of a base station in FIG. 1 into three areas, the topology after capacity expansion should be as illustrated in FIG. 2. When a new base station is added, coverage areas will be changed, and existing antennas shall be replaced with antennas of new specifications directivities and tilt angles of which must be reconfigured depending on antennas of the newly established base station. Furthermore, because the coverage areas are not normative, it may be difficult to obtain a good coverage for some dead zones regardless of adjusting. Therefore, to maintain a three-sector network structure, both locations and coverage areas of original base stations shall be changed, which will pose a great impact upon the original network.

A existing "one-off" network planning principle is commonly employed to avoid the above unsmooth capacity expansion, i.e. a network is planned and established considering capacity demand in future several years. This planning approach ensures that the network capacity will be sufficient in the coming several years, and therefore no capacity expansion will be needed. However, this means that a sufficient number of base stations shall be deployed at the beginning of constructing a wireless network. An advantage of this approach is that it satisfies a requirement for the number base stations in the coming years, while its disadvantage is that the initial investment will be large, which may bring an investment challenge to an operator. Moreover, the total number of base stations fails to be reduced, and the total cost of base station sites can not be lowered.

In this regard, the existing-adopted "one-off" networking approach is a solution that has to be employed to avoid the problem of capacity expansion with a premise that the problem of smooth capacity has not been solved, and thus has the following drawbacks:

1. Large initial investment: the "One-off" planning is to ensure that the network capacity will be sufficient in the coming years without any capacity expansion, and this means that more cellular networks shall be established at one time, which results in large initial investment and increased financial cost and risk;

2. High costs for base station sites: each base station involves some fixed costs such as cost of site building, accumulators, and tenancy. The more the base station sites, the higher the costs. Because the "one-off" planning requires more base stations, the costs of base station sites are higher.

3. Difficulty in planing: the "one-off" planning requires more base stations, but sometimes there is no appropriate site available for a base station at a place intended for the base station, which renders the network planning difficulty.

4. The existing solution just evades the problem of capacity expansion temporarily. The capacity will be saturated after years, so that the problem of capacity expansion with high costs will be inevitable.

SUMMARY OF THE INVENTION

Embodiments of the present invention provide an antenna device, a wireless cellular network, and a method of capacity expansion, which can enable a simple and efficient capacity expansion for a communication network.

An antenna device includes:

a contact element adapted to connect a base station to receive input signals from the base station;

an amplitude and phase allocating element adapted to allocate the input signals received by the contact element according to designed amplitudes and phases; and an antenna element comprising an array of antennas comprising an even number of columns, and adapted to receive and transmit the input signals allocated with the amplitudes and phases.

A wireless cellular network includes:

a base station adapted to generate signals; and an antenna device, adapted to allocate the signals from the base station with designed amplitudes and phases, and to transmit the signals through an array of antennas comprising an even number of columns.

A method of capacity expansion for a wireless cellular network includes receiving original signals from a base station;

allocating the original signals with preset amplitudes and phases; and transmitting the signals allocated with the amplitudes and phases through an array of antennas comprising an even number of columns so as to expand a network capacity to a preset multiple.

An array of antennas including an even number of columns has been adopted in the embodiments of the present invention, and the feed network structure of the antenna system has been improved. By adjusting the amplitudes and phases of original signals from a base station, it is possible to divide a regular-hexagon sector covered by an antenna of an existing base station into two semi-regular-hexagon sectors, or to divide a sector covered by an antenna of an existing base station into a plurality of sectors according to a preset multiple. On the one hand, during network capacity expansion, no additional base station sites are increased, and no antenna directivities need to be adjusted, thus a smooth capacity expansion may be achieved, the workload and complexity for capacity expansion may be reduced. On the other hand, coverage area of a base station can be increased during network planning, thus the number of base stations may be reduced, and the coverage cost may be lowered.

BRIEF DESCRIPTIONS OF THE DRAWINGS

DETAILED DESCRIPTIONS OF THE EMBODIMENTS

Technical solutions presented by the present invention will be described in detail with reference to the drawings and embodiments as follows.

Figure 1:
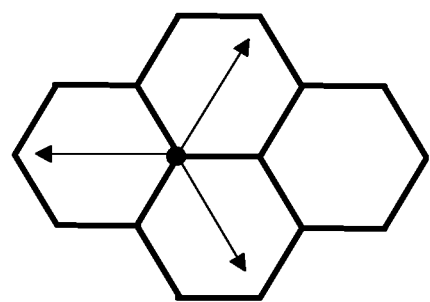
FIG. 1 is a schematic diagram of coverage areas of a base station in the prior art.
Figure 2:
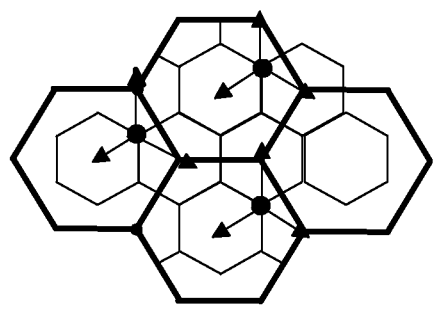
FIG. 2 is a schematic diagram of coverage areas of a base station after capacity expansion in the prior art.
Figure 3:
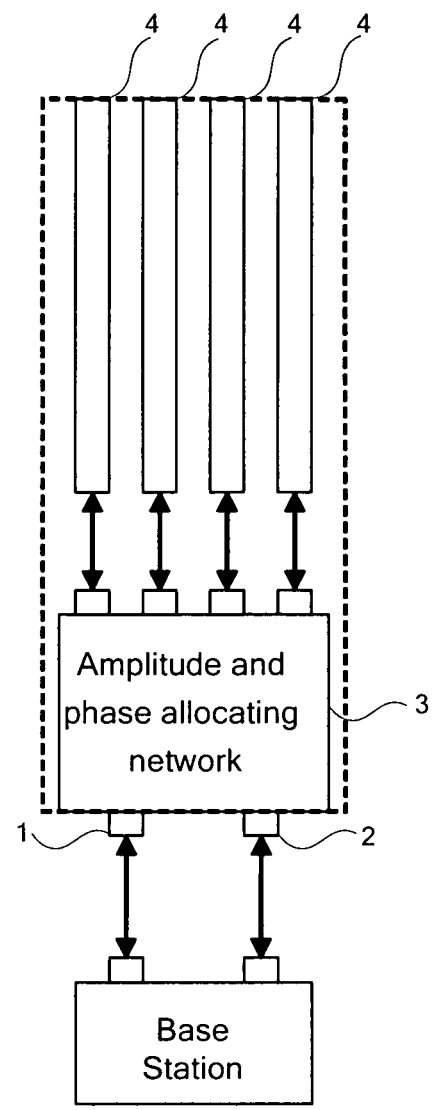
FIG. 3 is a structural diagram of an antenna device according to an embodiment of the present invention.

FIG. 3 is a structural diagram of an antenna device according to a first embodiment of the present invention. The antenna device is connected with a base station through a left contact 1 and a right contact 2. The device further includes an amplitude and phase allocating network 3 for allocating signals from the base station to an array of antennas with designed amplitudes and phases, and a splitting antenna 4 with an array of antennas comprising four columns for transmitting and receiving signals. Signals output from the left contact 1 or the right contact 2 pass the amplitude and phase allocating network 3 to generate four outputs respectively linked with the antennas of the array 4.

Figure 4:
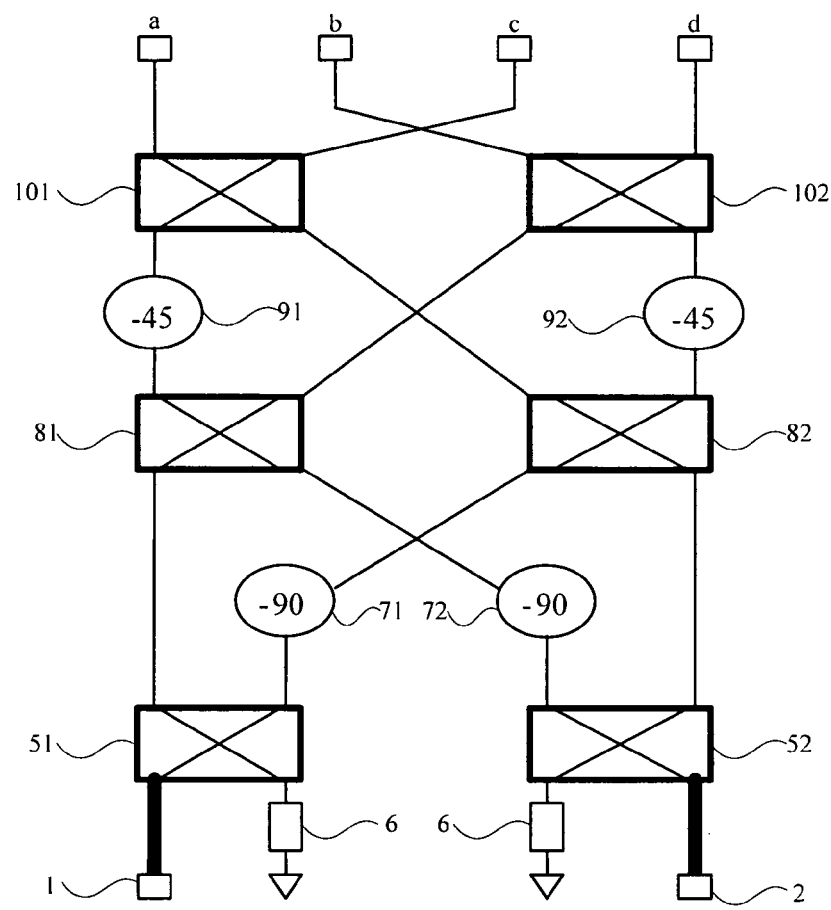
FIG. 4 is a structural diagram of an amplitude and phase allocating network according to an embodiment of the present invention.

Specifically, a structure of the amplitude and phase allocating network 3 is illustrated in FIG. 4. The amplitude and phase allocating network 3 includes:

two layer-1 3-decibel 90-degree bridges 51 and 52, each of which halves signals from one input channel to two channels and outputs, signals from the two output channels have a phase difference of 90 degrees;

two grounded match resistors 6 for absorbing redundant signals leaked from the layer-1 3-decibel 90-degree bridges 51 and 52;

two 90-degree phase shifters 71 and 72, each of which delays signals from one of the two output channels of a respective layer-1 3-decibel 90-degree bridges 51 or 52 by a phase of 90 degrees and then outputs;

two layer-2 3-decibel 90-degree bridges 81 and 82, each of which halves signals from one of two input channels to two channels and outputs, signals from the two output channels have a phase difference of 90 degrees;

two 45-degree phase shifters 91 and 92, each of which delays signals from one of the two output channels of a respective layer-2 3-decibel 90-degree bridges 81 or 82 by a phase of 45 degrees and then outputs; and two layer-3 3-decibel 90-degree bridges 101 and 102, each of which halves signals from one of two input channels to two channels and outputs, signals from the two output channels have a phase difference of 90 degrees, signals from the output channels are output through an array antennas 4 including four columns.

Signals inputted through the left contact 1 or the right contact 2 pass the amplitude and phase allocating network 3, and then four outputs with relative amplitudes of 0.4/1/1/0.4 and phases incrementing or decrementing by 90 degrees are generated, wherein a certain error is tolerated with respect to the amplitudes and the phases. For a layer-1 3-decibel 90-degree bridge, there is theoretically only one input, but practically there may be leaked signals. Therefore, two grounded match resistors 6 are employed to absorb the leaked signals. In this embodiment, the amplitude and phase allocating network may have a symmetric network structure and a good property of stationary waves.

In this embodiment, the antenna device can also be implemented by a plurality of paratactic antennas. Through setting performance parameters of the paratactic antennas, a united coverage area of a respective sub-sector formed by the paratactic antennas can be in correspondence with a coverage area of a corresponding sector before splitting. In this way, corresponding carriers can be set in the sub-sectors formed after splitting, so as to achieve network capacity expansion without changing a coverage area of a base station.

For example, in the capacity expansion of a three-sector structure network by using two paratactic antennas, through appropriate design, it can be achieved that a united coverage area of two sub-sectors after splitting of the two paratactic antennas be in correspondence with a coverage area of a corresponding sector prior to splitting. In this way, the number of sectors is increased, and more carriers can be set, which is equivalent to increasing the number of terminals. In the present invention, it can also be ensured through appropriate design that the antenna directivity diagram formed by the two paratactic antennas is eudipleural, i.e. each sector of the base station is split into two corresponding eudipleural sub-sectors. In this case, the network capacity is theoretically doubled.

In the example described above, two paratactic antennas are used for capacity expansion of a three-sector network. Because the three-sector structure of the wireless cellular network is not changed, directivities and tilt-down angles of the antennas shall not be adjusted for installation, thus resulting in a convenient network capacity expansion.

Figure 5:
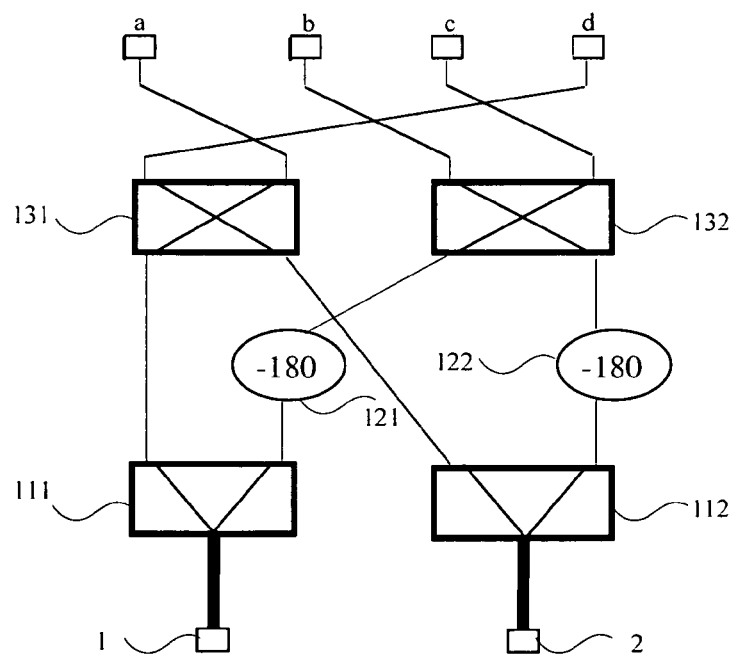
FIG. 5 is a structural diagram of an amplitude and phase allocating network according to another embodiment of the present invention.

In another embodiment, the antenna structure may be identical to that in the first embodiment and a structure of the amplitude and phase allocating network 3 is illustrated in FIG. 5. Specifically, the amplitude and phase allocating network 3 includes:

two 7.7-decibel couplers 111 and 112, each of which halves signals from one input channel to two channels and outputs, signals from the two output channels have a difference of 7.7-decibel;

two 180-degree phase shifters 121 and 122, each of which delays signals from one of the two output channels of a 7.7-decibel coupler by a phase of 180 degrees and then outputs; and two 3-decibel 90-degree bridges 131 and 132, each of which halves signals from one of two input channels to two channels and outputs, signals from the two output channels have a difference of 90 degrees, and are output through an array of antennas including four columns.

Functions of the amplitude and phase allocating network in this embodiment are identical to those of the corresponding part in the first embodiment except that the amplitude and phase allocating network in this embodiment is of only two levels, and thus has an advantage of lower loss in comparison with the first embodiment.

Figure 6:
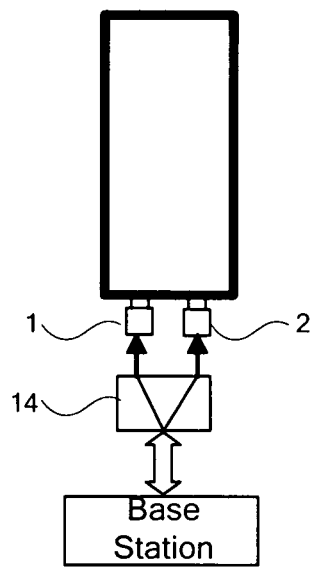
FIG. 6 is a schematic diagram of an antenna being connected to a base station through a power divider according to an embodiment of the present invention.

According to the present invention, an antenna device of a base station is connected to the base station through a power divider 14 during initial networking. A function of the power divider 14 here is to divide power of signals from a channel of the base station into two channels. As illustrated in FIG. 6, when signals transmitted from one channel of the base station is linked to an input of the power divider 14, the signals are halved into two channels and linked respectively to two input contacts of an antenna, allocated with amplitudes and phases, and then are transmitted through the array of antennas comprising multiple columns.

According to the first embodiment, the allocation of amplitudes and phases by the amplitude and phase allocating network particularly includes the following steps:

base station signals from the left contact 1 pass the layer-1 3-decibel 90-degree bridge 51, and are power-halved to generate two outputs, one of which lags the other by a phase of 90 degrees;

one of the outputs of the layer-1 3-decibel 90-degree bridge 51 passes a 90-degree phase shifter 71, and is phase delayed by 90 degrees, then enters the layer-2 3-decibel 90-degree bridge 82, where it is power-halved to generate two layer-2 outputs, one of which lags the other by a phase of 90 degrees; the other output of the layer-1 3-decibel 90-degree bridge 51 enters the layer-2 3-decibel 90-degree bridge 81, and is power-halved to generate other two layer-2 outputs, one of which lags the other by a phase of 90 degrees;

one of the two layer-2 outputs passes the 45-degree phase shifter 92 and is phase delayed by 45 degrees, then enters the layer-3 3-decibel 90-degree bridge 102 where it is power-halved to generate two layer-3 outputs, one of which lags the other by a phase of 90 degrees, the one of the two layer-3 outputs enters an antenna array b, and the other of the two layer-3 outputs enters an antenna array d; other of the two layer-2 outputs enters the layer-3 3-decibel 90-degree bridge 101, and is power-halved to generate two layer-3 outputs, one of which lags the other by a phase of 90 degrees, the one of the two layer-3 outputs enters an antenna array a, the other of the two layer-3 outputs enters an antenna array c; one of the other two layer-2 outputs enters the layer-3 3-decibel 90-degree bridge 102, and is power-halved to generate two layer-3 outputs, one of which lags the other by a phase of 90 degrees, one of the two layer-3 outputs enters the antenna array d, and the other of the two layer-3 outputs enters the antenna array b; and the other of the other two layer-2 outputs passes the 45-degree phase shifter 91 and is phase delayed by 45 degrees, then enters the layer-3 3-decibel 90-degree bridge 101, and is power-halved to generate two layer-3 outputs, one of which lags the other by a phase of 90 degrees, the one of the two layer-3 outputs enters the antenna array c, and the other of the two layer-3 outputs enters the antenna array a;

Because the amplitude and phase allocating network is of a laterally symmetric structure, processing for base station signals from the right contact is identical to the above processing.

According to the second embodiment, the allocation of amplitudes and phases by the amplitude and phase allocating network particularly includes the following steps:

base station signals from the left contact 1 enter the 7.7-decibel coupler 111, power of one output of the coupler is lower than that of the another output of the coupler by 7.7 decibels; one of the outputs of the 7.7-decibel coupler 111 enters the 3-decibel 90-degree bridge 131 and is powered-halved to generate two outputs, one of which lags the other by a phase of 90 degrees, the one of the two outputs enters an antenna array a, and the other of the outputs enters an antenna array d; the other of the outputs of the 7.7-decibel coupler 111 passes the 180-degree phase shifter 121 and is phase delayed by 180 degrees, then enters the 3-decibel 90-degree bridge 132, where it is power-halved to generate two outputs, one of which lags the other by a phase of 90 degrees, the one of the two outputs enters an antenna array c, and the other of the two outputs enters an antenna array b;

base station signals from the right contact 2 enter the 7.7-decibel coupler 112, power of one output of the coupler is lower than that of the another output of the coupler by 7.7 decibels; one of the outputs of the 7.7-decibel coupler 112 enters the 3-decibel 90-degree bridge 131 and is power-halved to generate two outputs, one of which lags the other by a phase of 90 degrees, one of the two outputs enters the antenna array d, and the other of the two outputs enters the antenna array a; and the other of the outputs of the 7.7-decibel coupler 112 passes the 180-degree phase shifter 122 and is phase delayed by 180 degrees, then enters the 3-decibel 90-degree bridge 132, and is power-halved to generate two outputs, one of which lags the other by a phase of 90 degrees, the one of the two outputs enters the antenna array b, and the other of the two outputs enters the antenna array c.

Figure 7:
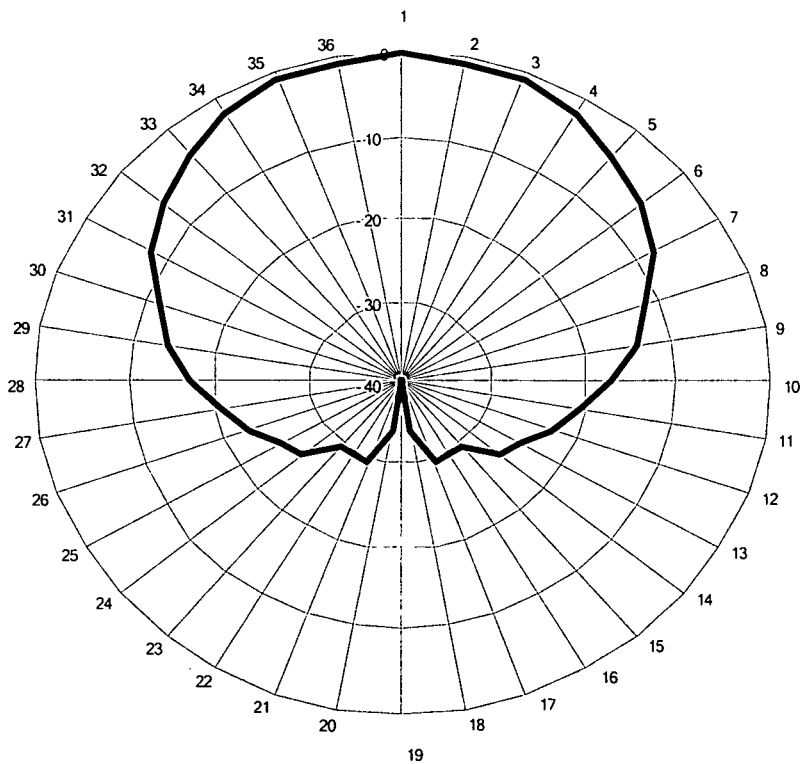
FIG. 7 is a directivity diagram of an antenna when connected to a base station through a power divider according to an embodiment of the present invention.

In such a case, the number of terminals supported in the coverage area of the antennas is the number of terminals supported by signals from one channel. Base station signals from one channel enter a contact of the antennas and are allocated with phases and amplitudes, and is transmitted through the array antennas comprising four columns. An antenna directivity diagram with a signal input being a reference is illustrated in FIG. 7, where the antennas appear as a conventional antenna with a coverage area of a regular hexagon cell, and thus can be used for networking as a conventional antenna.

Figure 8:
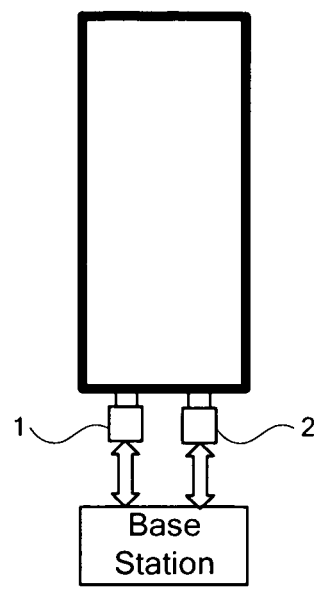
FIG. 8 is a schematic diagram of an antenna being connected directly to a base station according to an embodiment of the present invention.
Figure 9:
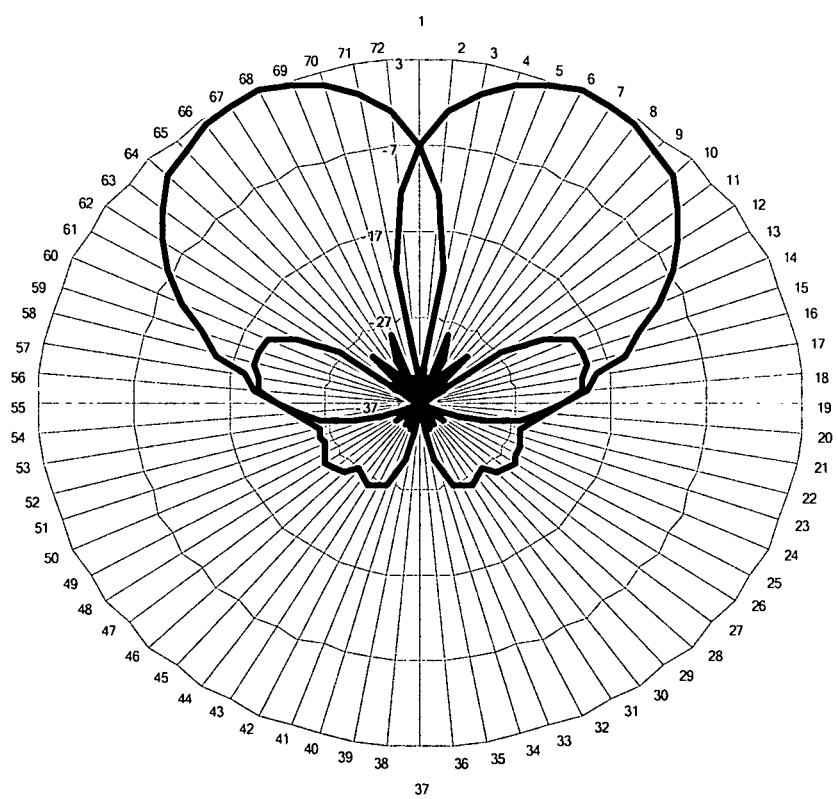
FIG. 9 is a directivity diagram of an antenna when connected directly to a base station according to an embodiment of the present invention.

When signals from two channels of the base station enter directly through the input contacts of the antenna in FIG. 3 respectively, as illustrated in FIG. 8, signals from the two channels subject to identical phase and amplitude allocation after entering the antenna contacts and then are transmitted respectively through a column of the array of antennas, where each column of the antenna elements in the array of antenna comprising four columns transmit the phase and amplitude allocated signals from the two channels. Thus, two different directivity diagrams can be obtained as illustrated in FIG. 9. The directivity diagrams in FIG. 9 are characterized in that the two new directivity diagrams can be regarded as a result of splitting the directivity diagram shown in FIG. 7. Theoretically, with a totally perfect splitting, a profile of the two directivity diagrams in combination can be identical to that in FIG. 7. Therefore, input signals from the base station are added and transmitted through two wave beams of the antennas, resulting in an approximately doubled network capacity. Because the outer profiles of the antenna directivity diagrams in a horizontal plane keep unchanged, the total coverage area will not be changed, and there is no need for the antenna angles to be adjusted.

In the above two embodiments, the array of antennas includes four columns because it is necessary for the amplitude and phase allocating network employed in the embodiments. If other amplitude and phase allocating networks can be used to achieve the directivity diagrams as implemented according to the present invention, the array of antennas may include an other even number of columns different from four.

It can be appreciated by those skilled in the art that some or all of the steps in the methods according to the embodiments of the present invention can be performed through a program instructing relevant hardware, where the program can be stored in a computer-readable storage medium. When executed, the program involve the steps of receiving original signals from a base station; allocating the original signals with preset amplitudes and phases; and transmitting the signals allocated with amplitude and phases through an array of antenna comprising an even number of columns, so as to expand the network capacity to a preset multiple. The storage medium can be, such as, ROM/RAM, a magnetic disk and an optical disk.

It shall be noted that the above embodiments are merely illustration of but not limitation to the technical solutions according to the present invention, and while the present invention has been described in detail with reference to the preferred embodiments, it shall be recognized by those skilled in the art that various modifications or equivalent substitutions can be made to the inventive solutions without departing from the spirit and scope of the present invention as defined in the claims.

What is claimed is:

1. An antenna device, comprising:
a contact element configured to connect the antenna device to a base station to receive signals from the base station;
an amplitude and phase allocating element configured to allocate the signals received by the contact element according to designed amplitudes and phases; and
an antenna element configured to receive and transmit the signals allocated with the amplitudes and phases, wherein the antenna element comprises an array of antennas and the array of antennas comprises an even number of columns;
wherein the amplitude and phase allocating element comprises:
two layer-1 3-decibel 90-degree bridges each configured to halve signals input from one channel, and to output layer-1 output signals in first two channels with a phase difference of 90 degrees;
two 90-degree phase shifters each configured to delay the layer-1 output signals from one of the first two channels of a layer-1 3-decibel 90-degree bridge by a phase of 90 degrees and then output phase-shifted layer-1 output signals;
two layer-2 3-decibel 90-degree bridges each configured to halve the phase-shifted layer-1 output signals from one of the first two channels, and to output two layer-2 output signals in second two channels with a phase difference of 90 degrees;
two 45-degree phase shifters respectively configured to delay the layer-2 output signals from one of the second two channels of the respective layer-2 3-decibel 90-degree bridge by a phase of 45 degrees and then output phase-shifted layer-2 output signals; and
two layer-3 3-decibel 90-degree bridges respectively configured to halve the phase-shifted layer-2 output signals from one of the second two channels, and to output layer-3 output signals in two channels with a phase difference of 90 degrees through the array of antennas comprising four columns;
wherein one input of each of the layer-2 3-decibel 90-degree bridges is connected with an output of one of the layer-1 3-decibel bridges, another input of each of the layer-2 3-decibel 90-degree bridges is connected with an output of one of the 90-degree phase shifter, and an input of the one 90-degree phase shifter is connected with an output of the other layer-1 3-decibel bridge;
or the amplitude and phase allocating element comprises:
two layer-1 3-decibel 90-degree bridges each configured to halve signals input from one channel, and to output layer-1 output signals in first two channels with a phase difference of 90 degrees;
two 90-degree phase shifters each configured to delay the layer-1 output signals from one of the first two channels of a layer-1 3-decibel 90-degree bridge by a phase of 90 degrees and then output phase-shifted layer-1 output signals;

two layer-2 3-decibel 90-degree bridges each configured to halve the phase-shifted layer-1 output signals from one of the first two channels, and to output two layer-2 output signals in second two channels with a phase difference of 90 degrees;

two 45-degree phase shifters respectively configured to delay the layer-2 output signals from one of the second two channels of the respective layer-2 3-decibel 90-degree bridge by a phase of 45 degrees and then output phase-shifted layer-2 output signals; and two layer-3 3-decibel 90-degree bridges respectively configured to halve the phase-shifted layer-2 output signals from one of the second two channels, and to output layer-3 output signals in two channels with a phase difference of 90 degrees through the array of antennas comprising four columns;

wherein each of the two inputs of one of the two 3-decibel 90-degree bridges is connected with one output of one of the two 7.7-decibel couplers, and each of two inputs of the other 3-decibel 90-degree bridge is connected respectively with one output of one of the two 180-degree phase shifters, and inputs of the two 180-degree phase shifters are each connected with the other output of the respective one of the two 7.7-decibel couplers.

2. The antenna device according to claim 1, wherein the array of antennas comprises at least four columns.

3. The antenna device according to claim 1, wherein the contact element comprises at least two contacts, configured to receive the signals from the base station respectively.

4. The antenna device according to claim 3, wherein the contact element comprises two symmetric contacts respectively configured to receive the signals from the base station.

5. The antenna device according to claim 4, wherein the amplitude and phase allocating element further comprises:
two grounded match resistors, respectively configured to absorb signals leaked from the layer-1 3-decibel 90-degree bridges.

6. The antenna device according to claim 1, wherein the antenna device is configured to operate within a wireless cellular network, wherein the wireless cellular network comprises a base station and the antenna device wherein:
the base station is configured to generate signals; and
the antenna device is configured to allocate the signals from the base station with designed amplitudes and phases and transmit the signals allocated with designed amplitudes and phases through the array of antenna comprising the even number of columns.

7. The wireless cellular network according to claim 6, further comprising a power divider configured to halve power of the signals generated by the base station and send the signals to the antenna device.

8. The wireless cellular network according to claim 6, wherein the antenna device comprises:
the contact element configured to connect the antenna device with the base station to receive signals from the base station;
the amplitude and phase allocating element configured to allocate the signals received by the contact element with designed amplitudes and phases; and
the antenna element configured to receive and transmit the signals allocated with the amplitudes and phases, wherein the antenna element comprises the array of antennas and the array of antennas comprises the even number of columns.

9. A method of capacity expansion for a wireless cellular network, comprising:
receiving original signals from a base station;
allocating the original signals with preset amplitudes and phases; and
transmitting the signals allocated with the amplitudes and phases through an array of antennas comprising an even number of columns to expand a network capacity to a preset multiple;
wherein allocating the original signals with preset amplitudes and phases comprises:
halving the original signals from one channel to obtain layer-1 output signals in two channels with a phase difference of 90 degrees;
delaying the layer-1 output signals respectively from one of the two channels by a phase of 90 degrees to obtain phase-shifted layer-1 output signals in two channels;
halving the phase-shifted layer-1 output signals respectively from one of the two channels to obtain layer-2 output signals in two channels with a phase difference of 90 degrees;
delaying the layer-2 output signals respectively from one of the two channels by a phase of 45 degrees to obtain phase-shifted layer-2 output signals in two channels; and
halving the phase-shifted layer-2 output signals respectively from one of the two channels to obtain layer-3 output signals in two channels with a phase difference of 90 degrees; or
allocating the original signals with preset amplitudes and phases comprises:
halving the original signals from one channel into layer-1 output signals in two channels with a 7.7-decibel difference;
delaying the layer-1 output signals respectively from one of the two channels by a phase of 180 degrees to obtain phase-shifted layer-1 output signals in two channels; and
halving the phase-shifted layer-1 output signals respectively from one of the two channels into layer-2 output signals in two channels with a phase difference of 90 degrees.

10. The method according to claim 9, wherein following receiving the original signals from the base station, and prior to allocating the original signals with the preset amplitudes and phases, the method further comprises:
halving power of the original signals from the base station.

11. The method according to claim 9, wherein transmitting the signals allocated with the amplitude and phases through the array of the even number of columns of antennas, to expand the network capacity to the preset multiple comprises:
transmitting the signals allocated with the amplitudes and phases through an array of antennas comprising four columns, to double the network capacity.

12. The method according to claim 9, wherein following halving the original signals from one channel and prior to delaying the layer-1 output signals respectively from one of the two channels, the method further comprises:
absorbing signals leaked during halving the original signals from one channel.

* * * * *